United States Patent
Chang et al.

(10) Patent No.: US 7,986,530 B2
(45) Date of Patent: Jul. 26, 2011

(54) FIXING STRUCTURE FOR BATTERY

(75) Inventors: Ching-Hui Chang, Banqiao (TW); Ching-Feng Hsieh, Taipei (TW); Ko-Hsien Lee, Dayuan Township (TW)

(73) Assignee: Askey Computer Corp. (TW)

( * ) Notice: Subject to any disclaimer, the term of this patent is extended or adjusted under 35 U.S.C. 154(b) by 0 days.

(21) Appl. No.: 12/603,618

(22) Filed: Oct. 22, 2009

(65) Prior Publication Data

US 2011/0075381 A1     Mar. 31, 2011

(30) Foreign Application Priority Data

Sep. 25, 2009   (TW) ............................... 98217789 U

(51) Int. Cl.
*H05K 7/00*      (2006.01)
(52) U.S. Cl. ...................... 361/747; 361/801; 361/803
(58) Field of Classification Search .......... 361/800–803, 361/747
See application file for complete search history.

(56) References Cited

U.S. PATENT DOCUMENTS

| | | | |
|---|---|---|---|
| 6,563,713 B2* | 5/2003 | Yang .............................. | 361/752 |
| 6,583,600 B2* | 6/2003 | Haga et al. ..................... | 320/110 |
| 6,994,576 B2* | 2/2006 | Tanaka et al. .................. | 439/188 |
| 2007/0091556 A1* | 4/2007 | Wu ................................ | 361/683 |
| 2009/0040737 A1* | 2/2009 | Shimura et al. ............... | 361/752 |

FOREIGN PATENT DOCUMENTS

TW        M334380        12/1996

* cited by examiner

*Primary Examiner* — Hung S Bui
(74) *Attorney, Agent, or Firm* — Schmeiser, Olsen & Watts, LLP

(57) ABSTRACT

A fixing structure for a battery positions the battery in a casing of an electronic device. The fixing structure includes at least a connecting portion, at least a locking portion, and a receiving portion. The connecting portion is on one side of the battery and with a waterproof element. The locking portion is on the other side of the battery and is opposite to the connecting portion. The receiving portion is on the casing and with a first inserting portion and a plurality of second inserting portions. The first inserting portion and the second inserting portions correspond in position to the connecting portion and the locking portion respectively. Hence, the fixing structure protects the electronic device against permeation of water and ensures secure positioning of the battery.

10 Claims, 5 Drawing Sheets

FIXING STRUCTURE FOR BATTERY

CROSS-REFERENCE TO RELATED APPLICATIONS

This non-provisional application claims priority under 35 U.S.C. §119(a) on Patent Application No(s). 098217789 filed in Taiwan, R.O.C. on 25 Sep. 2009, the entire contents of which are hereby incorporated by reference.

FIELD OF THE INVENTION

The present invention relates to battery fixing technology, and more particularly, to a fixing structure for a battery.

BACKGROUND OF THE INVENTION

Portable electronic devices are not only compact and convenient to carry but also feature special human-machine interfaces (such as touch control input interfaces), wireless communication (such as voice and data transmission), or artificial intelligence (such as text and voice recognition) and thus are widely used in daily life. Portable electronic devices are in wide use including mobile computers (ultra mobile personal computer, UMPC), interpreters, personal digital assistants (PDA), notebook computers, video players, and handheld game consoles A battery is the most important accessory to a portable electronic device. It is because batteries are rechargeable and can supply sufficient power to electronic devices at a venue short of power supply so as for the electronic devices to operate steadily. Take mobile computers (UMPC) as an example, mobile computers are versatile and thus applicable to daily life and especially industries. With industrial environments being typically adverse, sometimes mobile computers (UMPC) have to be used in the humid and dusty environment. Since a battery is usually located in an open space, the moisture or dust readily invades into the battery receiving space. Hence, secure positioning and prevention of permeation are of vital importance to batteries.

Referring to FIG. 1, there is shown a conventional battery fixing structure for the use with a portable electronic product, as disclosed in Taiwan Patent No. 096221889. As shown in the drawing, a portable electronic device 1 has a casing 11, and a receiving space 10 is provided on one side of the casing 11 so as for a battery 13 to be received in the receiving space 10. The battery 13 supplies electric power to the portable electronic device 1. The battery 13 is provided with a connecting portion 131 and a plurality of fixing hooks 133. The casing 11 is provided with a slot 111 corresponding in position to the connecting portion 131 and a plurality of movable hooks 113. The movable hooks 113 protrude into the receiving space 10 and correspond in position to the fixing hooks 133 respectively. Receiving the battery 13 in the receiving space 10 enables the connecting portion 131 to be inserted into the slot 111, and the fixing hooks 133 to be engaged with the movable hooks 113 respectively, so as the battery 13 can be fixed in position to the portable electronic device 1.

However, the prior art does have its drawbacks. The conventional battery fixing structure is not waterproof or dustproof. The battery 13 is not firmly fixed in position, because the battery 13 is fixed in position to the portable electronic device 1 merely by the engagement between the fixing hooks 133 on one side of the battery 13 and the movable hooks 113 in the receiving space 10. The portable electronic device 1 is compact and thus likely to be dropped inadvertently; in consequence, the battery 13 is ejected out from the receiving space 10, as a result, the power interruption leads to loss of data.

To circumvent the aforesaid event, some manufacturer puts forth a battery fixing structure whereby a battery and a casing of a portable electronic device are screwed together, so as to prevent power interruption which might otherwise follow the release of the battery from a receiving space of the inadvertently dropped portable electronic device. However, the battery fixing technique is not free of a drawback either. The battery fixing structure enables the battery to be firmly fixed in position to the receiving space and yet renders installation and uninstalling of the battery inconvenient.

SUMMARY OF THE INVENTION

In view of the aforesaid drawbacks of the prior art, it is an objective of the present invention to provide a fixing structure for a battery, such that the fixing structure is effectively in preventing permeation of water and providing secure positioning.

Another objective of the present invention is to provide a fixing structure for a battery, such that the fixing structure is effectively in preventing a battery from dislocation.

To achieve the above and other objectives, the present invention provides a fixing structure for a battery, for positioning the battery in a casing of an electronic device, the fixing structure comprising: at least a connecting portion provided on a side of the battery and provided with a waterproof element; at least a locking portion provided on the other side of the battery, which is opposite to the connecting portion; and a receiving portion provided on the casing, wherein a first inserting portion and a plurality of second inserting portions are provided in the receiving portion and correspond in position to the connecting portion and the locking portion respectively.

In a preferred embodiment, the battery is further provided with a covering panel connected thereto and configured to hermetically seal the receiving portion. The covering panel is formed with an engaging portion, such that the engaging portion is an integral part of the covering panel. A plug element corresponding in position to the engaging portion is provided on the casing. The plug element is made of rubber, plastics, or any other equivalent materials. Likewise, the waterproof element is made of rubber, plastics, or any other equivalent materials.

Unlike the prior art, the present invention discloses encapsulating a connecting portion with a waterproof element and disposing a plug element on a casing to prevent a liquid, such as water, from permeating into the connecting portion and thus create a short circuit or cause damage to a component inside an electronic device. Hence, the present invention improves on the prior art by preventing permeation of a liquid. Also, a locking portion is provided on one side of a battery, and an engaging portion is provided on the other side of the battery and thus opposite the locking portion; in so doing, the present invention provides multiple means of positioning and thus is effective in preventing the battery from being released from a receiving portion of an electronic device when the electronic device drops inadvertently, which might otherwise create a short circuit or result in data loss.

DETAILED DESCRIPTION OF THE EMBODIMENT

The way of implementing the present invention is hereunder illustrated with a specific embodiment to enable persons skilled in the art to readily gain insight into the other advantages and effects of the present invention with references made to the disclosure contained in the specification.

Figure 1:
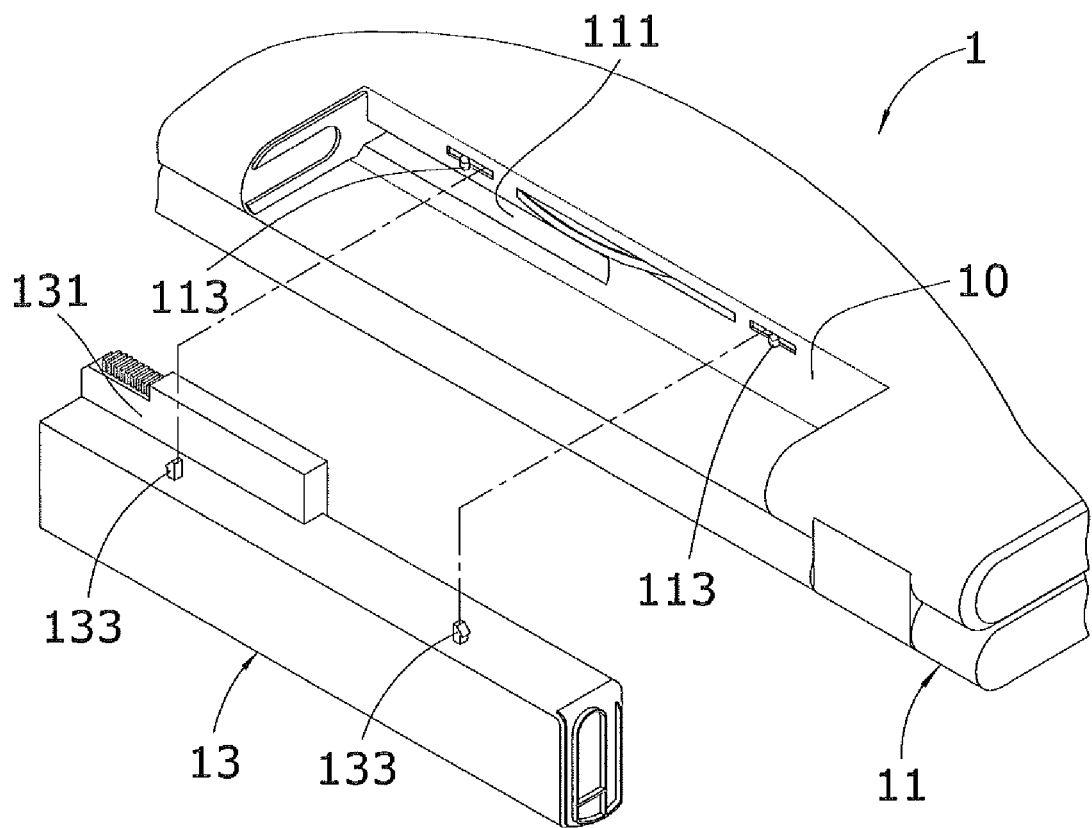
FIG. 1 is an exploded perspective view of a conventional fixing structure for a battery.
Figure 2A:
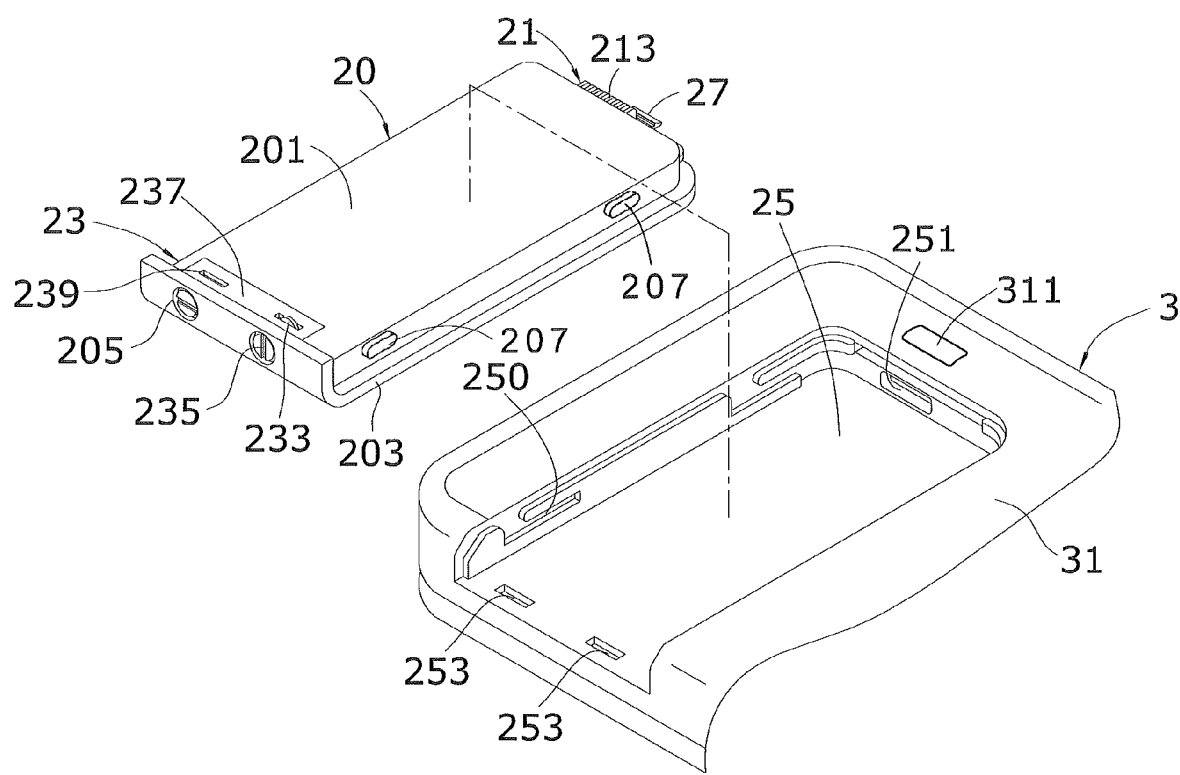
FIG. 2a is an exploded perspective view of a preferred embodiment of a fixing structure for a battery according to the present invention.

Referring to FIG. 2a through FIG. 3b, there are shown schematic views of a preferred embodiment according to the present invention. Referring to FIG. 2a, a fixing structure for a battery according to the present invention enables a battery 20 to be fixed in position to a casing 31 of an electronic device 3. The fixing structure for the battery 20 comprises a connecting portion 21, a locking portion 23, and a receiving portion 25. The connecting portion 21 and the locking portion 23 are provided on opposite sides of the battery 20 respectively. The receiving portion 25 is provided on the casing 31. In this embodiment, the battery 20 further comprises a battery body 201 and a covering panel 203 connected to the battery body 201 and configured to hermetically seal the receiving portion 25.

Figure 2B:
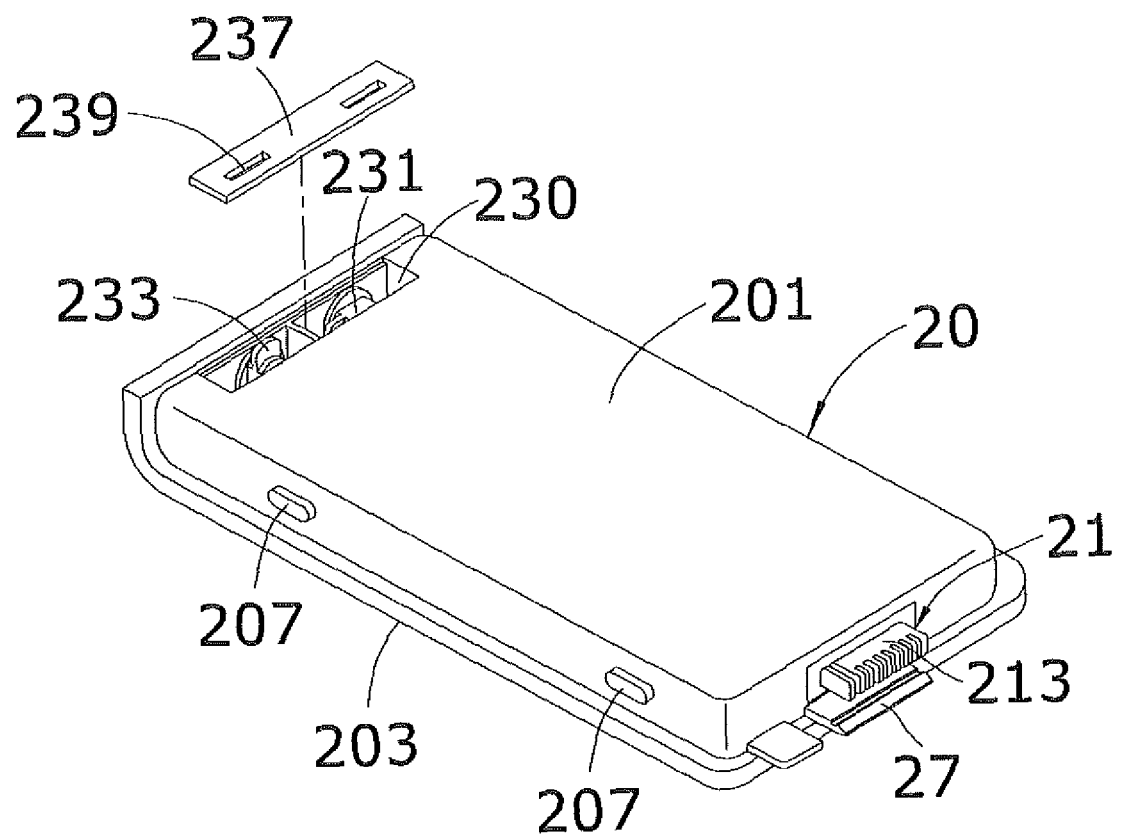
FIG. 2b is another exploded perspective view of the preferred embodiment of the fixing structure for a battery according to the present invention.

Referring to FIG. 2a and FIG. 2b, the connecting portion 21 is provided on one side of the battery 20 and comprises a plurality of conductive terminals 211 (shown in FIG. 3b) and a waterproof element 213. The conductive terminals 211 are encapsulated mostly by the waterproof element 213 except that a contact end of each of the conductive terminals 211 is exposed from the waterproof element 213. Inserting the connecting portion 21 into a first inserting portion 251 provided in the casing 31 of an electronic device 3 (to be described below) enables the waterproof element 213 to hermetically seal the first inserting portion 251 and thereby absolutely prevent a liquid, such as water, from permeating into the first inserting portion 251. The waterproof element 213 is made of soft rubber; however, in another embodiment, the waterproof element 213 is made of soft plastics or any other flexible materials, provided that the waterproof element 213 or any equivalent element hermetically seals the first inserting portion 251.

Referring to FIGS. 2a and 2b, the locking portion 23 is provided on the other side of the battery 20 and thus is opposite to the connecting portion 21. The locking portion 23 is provided with a plurality of neighboring receiving chambers 230. The receiving chambers 230 are each provided therein with a rotatable eccentric wheel 231. Each of the eccentric wheels 231 is integrally formed with an engaging plate 233 protruding outward. A plurality of through holes 205 corresponding in position to the eccentric wheels 231 respectively, are provided on one side of the covering panel 203 of the battery 20 so as for the outer side of each eccentric wheel 231 to be exposed from the through holes 205. The outer side of each eccentric wheel 231 is provided with a groove 235, such that the grooves 235 are exposed from the through holes 205 respectively. A baffle 237 is disposed above the receiving chambers 230 and formed with chamber holes 239 corresponding in position to the engaging plates 233 respectively, so as for the engaging plates 233 to stick out of the chamber holes 239 respectively.

Referring to FIGS. 2a and 2b, the receiving portion 25 is configured to receive the battery 20. A plurality of rails 250 are provided on the side walls of the receiving portion 25. A plurality of guiding bumps 207 corresponding in position to the rails 250 respectively, are provided on the side walls of the battery 20. The first inserting portion 251 formed in the casing 31 is configured to correspond in position to the connecting portion 21 provided on one side of the battery 20 when the battery 20 is received in the receiving portion 25. Although the dimensions of the waterproof element 213 are slightly larger than the dimensions of the first inserting portion 251, inserting the connecting portion 21 into the first inserting portion 251 enables the waterproof element 213, which is made of soft rubber and thus flexible, to be plugged in the first inserting portion 251 to thereby hermetically seal the first inserting portion 251 and prevent the permeation of water. A plurality of second inserting portions 253 corresponding in position to the engaging plates 233 of the eccentric wheels 231 respectively, are provided in the receiving portion 25, such that rotation of the eccentric wheels 231 causes the engaging plates 233 to be inserted into the second inserting portions 253 and fixed in position thereto. However, in another embodiment, the first inserting portion 251 is a slot or any equivalent structure whereby the connecting portion 21 is fixed in position to the first inserting portion 251. In another embodiment, the second inserting portions 253 are a plurality of slots or other equivalent structures whereby the engaging plates 233 are fixed in position to the second inserting portions 253 respectively.

Figure 3A:
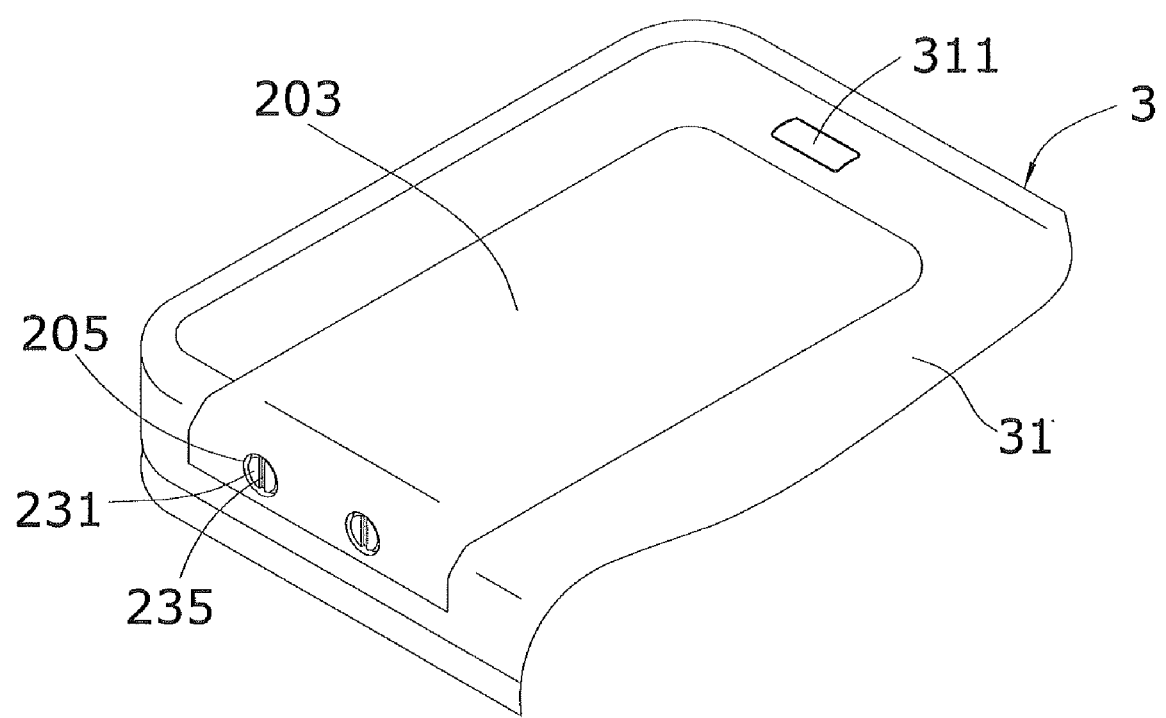
FIG. 3a is a perspective view of the preferred embodiment of the fixing structure for a battery according to the present invention.
Figure 3B:
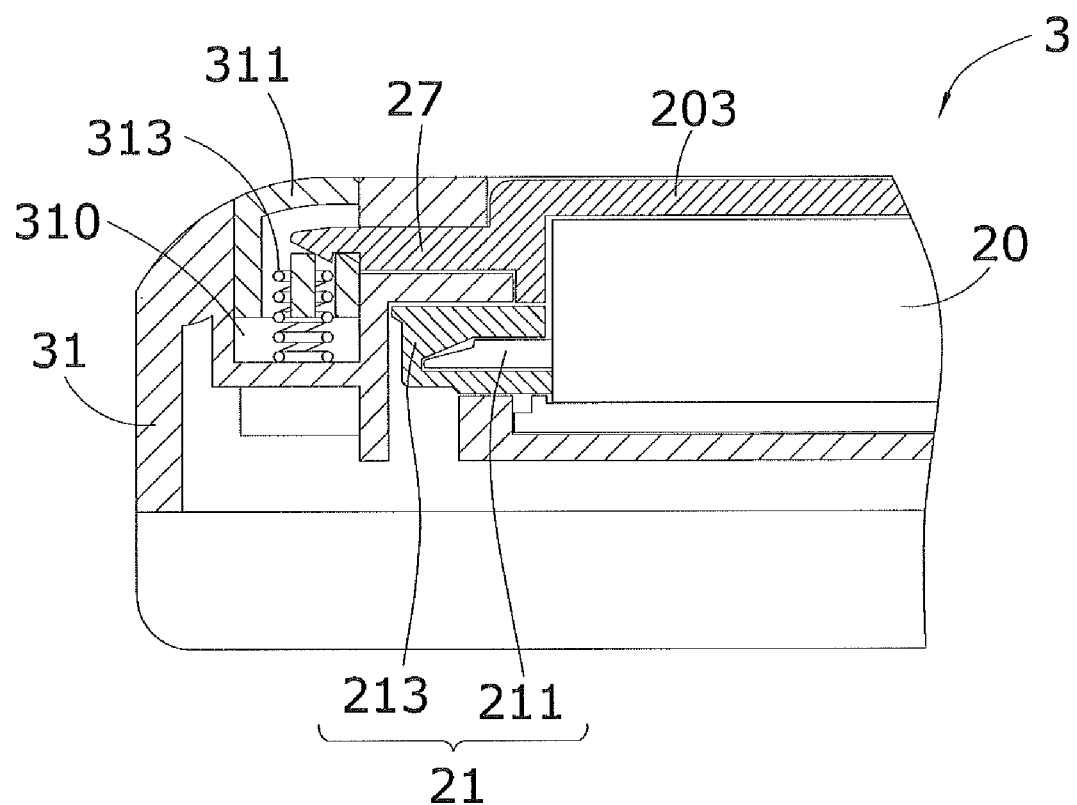
FIG. 3b is a partial cross-sectional view of the preferred embodiment of the fixing structure for a battery according to the present invention.

Referring to FIGS. 3a and 3b, the covering panel 203 comprises an engaging portion 27. The engaging portion 27 enhances the bonding of the battery 20 and the casing 31 when the battery 20 is received in the receiving portion 25. The engaging portion 27 is an integral part of the covering panel 203 and is positioned proximate to the connecting portion 21. A plug element 311 corresponding in position to the engaging portion 27 is provided on the casing 31. The plug element 311 is provided therein with a spring 313. The bottom end of the plug element 311 is spaced apart from the casing 31 by a distance 310, such that the plug element 311 can undergo downward resilient displacement under an external force.

Where the battery 20 is fixed in position, the engaging portion 27 is engaged with the plug element 311, allowing the battery 20 to be better fixed in position. To release the battery 20 from the electronic device 3, a user has to press the plug element 311. Pressing the plug element 311 allows resilient downward displacement of the plug element 311 to take place in conjunction with compression of the spring 313. The resilient downward displacement of the plug element 311 allows the engaging portion 27 to be disengaged from the plug element 311. The compression of the spring 313 is followed by the recoil thereof, and in consequence the plug element 311 returns to its initial position. In this embodiment, the plug element 311 is made of soft rubber and thus is waterproof. In another embodiment, the plug element 311 is made of soft plastics or any equivalent material effective in preventing permeation of water.

With the battery 20 being received in the receiving portion 25, the groove 235 on the outer side of each of the eccentric wheels 231 is exposed; meanwhile, the user can insert a plate-like tool into the groove 235 so as to rotate a corresponding one of the eccentric wheels 231. Rotating the corresponding one of the eccentric wheels 231 allows the engaging plates 233 (shown in FIG. 2a) to be inserted into the second inserting portions 253 (shown in FIG. 2a) respectively, such that the battery 20 is firmly fixed in position to the receiving portion 25.

With the connecting portion 21 being encapsulated with the waterproof element 213, the waterproof element 213 hermetically seals the first inserting portion 251; hence, water is prevented from permeating into the first inserting portion 251. Therefore, the present invention has an advantage: even if the electronic device 3 is inadvertently dropped into water, there will be no permeation of water into the electronic device 3 which might otherwise cause a short circuit to the electronic device 3 or damage the electronic device 3 by introducing moisture into the electronic device 3. Also, the present invention discloses providing the covering panel 203 with the engaging portion 27 positioned proximate to the connecting portion 21 and providing the locking portion 23 on the other side of the covering panel 203 so as for the locking portion 23 to be opposite the connecting portion 21; hence, the present invention provides dual means of positioning and thus is effective in preventing the battery 20 from being released from the receiving portion 25 or from being ejected from the receiving portion 25 when the battery 20 drops inadvertently. Also, the plug element 311 engageable with the engaging portion 27 is provided on the casing 31 to allow the battery 20 to be better fixed in position, and the plug element 311 can be pressed to thereby release the battery 20 from the receiving portion 25 readily; hence, the plug element 311 makes installation and uninstalling of the battery 20 simpler. Last but not least, the plug element 311 is waterproof and thus effective in preventing a liquid, such as water, from permeating into the casing 31.

The foregoing embodiment is provided to illustrate and disclose the features and functions of the present invention and is not intended to be restrictive of the scope of the present invention. It should be understood by those in the art that many equivalent modifications and variations can be made to the aforesaid embodiment according to the spirit and principle in the disclosure of the present invention and still fall within the scope of the present invention as set forth in the appended claims.

What is claimed is:

1. A fixing structure for a battery, for positioning the battery in a casing of an electronic device, the fixing structure comprising:

at least a connecting portion provided on a side of the battery and provided with a waterproof element;

at least a locking portion provided on another side of the battery that is opposite to the connecting portion;

a receiving portion provided on the casing and provided therein with a first inserting portion and a plurality of second inserting portions, wherein the first inserting portion and the second inserting portions correspond in position to the connecting portion and the locking portion respectively; and the battery further includes a battery body and a covering panel that includes an engaging portion, and wherein a plurality of through holes corresponding in position to the at least a locking portion are provided on a side of the covering panel.

2. The fixing structure of claim 1, wherein the engaging portion is an integral part of the covering panel and is positioned proximate to the connecting portion.

3. The fixing structure of claim 2, wherein a plug element is provided on the casing and corresponding in position to the engaging portion.

4. The fixing structure of claim 3, wherein the plug element is made of rubber or plastics.

5. The fixing structure of claim 1, wherein the locking portion is provided with at least an eccentric wheel integrally formed with an engaging plate, and an outer side of the eccentric wheel is exposed from a corresponding one of the through holes.

6. The fixing structure of claim 5, wherein the second inserting portions are a plurality of slots corresponding in position to the engaging plates respectively.

7. The fixing structure of claim 1, wherein a plurality of rails and a plurality of guiding bumps corresponding in position to the rails respectively, are provided on side walls of the receiving portion and provided on side walls of the battery respectively.

8. The fixing structure of claim 1, wherein the waterproof element is made of rubber or plastics.

9. The fixing structure of claim 1, wherein the first inserting portion is a slot.

10. The fixing structure of claim 1, wherein the second inserting portions are a plurality of slots.

* * * * *